(12) United States Patent
Rafailovich et al.

(10) Patent No.: US 7,553,898 B2
(45) Date of Patent: Jun. 30, 2009

(54) FLAME RETARDANT PLASTIC COMPOSITIONS

(75) Inventors: Miriam Rafailovich, Plainview, NY (US); David Abecassis, Huntington, NY (US)

(73) Assignee: The Research Foundation of State University of New York, Albany, NY (US)

( * ) Notice: Subject to any disclaimer, the term of this patent is extended or adjusted under 35 U.S.C. 154(b) by 308 days.

(21) Appl. No.: 11/601,382

(22) Filed: Nov. 17, 2006

(65) Prior Publication Data

US 2007/0135545 A1   Jun. 14, 2007

Related U.S. Application Data

(60) Provisional application No. 60/738,093, filed on Nov. 18, 2005.

(51) Int. Cl.
*C08K 3/34* (2006.01)
*C08K 5/03* (2006.01)

(52) U.S. Cl. ............... 524/445; 524/411; 524/469; 524/496

(58) Field of Classification Search ........... 524/411, 524/445, 447, 469, 496
See application file for complete search history.

(56) References Cited

U.S. PATENT DOCUMENTS

| | | | |
|---|---|---|---|
| 5,077,337 A | | 12/1991 | Atwell et al. |
| 5,171,757 A | * | 12/1992 | Stobby et al. ............. 521/85 |
| 5,180,767 A | * | 1/1993 | Sakai et al. ............. 524/411 |
| 5,326,797 A | * | 7/1994 | Zimmerman et al. ........ 524/59 |
| 5,409,980 A | | 4/1995 | Myszak, Jr. |
| 5,766,512 A | | 6/1998 | Watanabe et al. |
| 5,773,500 A | | 6/1998 | Reichmann |
| 5,889,100 A | * | 3/1999 | Asai et al. ............. 524/451 |
| 5,906,679 A | | 5/1999 | Watanabe et al. |
| 5,925,276 A | * | 7/1999 | Batliwalla et al. ........... 219/553 |
| 6,197,864 B1 | * | 3/2001 | Borke et al. ............. 524/436 |
| 6,500,889 B2 | | 12/2002 | Yasuda et al. |
| 7,005,457 B2 | | 2/2006 | Loh et al. |
| 7,067,576 B2 | | 6/2006 | Jung et al. |
| 7,084,196 B2 | | 8/2006 | Troutman et al. |
| 2003/0096070 A1 | * | 5/2003 | Matsuoka et al. .......... 428/36.9 |
| 2005/0143508 A1 | * | 6/2005 | Tyagi et al. ............. 524/423 |
| 2006/0030660 A1 | * | 2/2006 | Eschborn et al. ........... 524/502 |
| 2007/0199481 A1 | * | 8/2007 | Roelofs ................ 106/487 |
| 2008/0251273 A1 | | 10/2008 | Brown et al. ............ 174/113 R |

OTHER PUBLICATIONS

Hays, Sean, "New Information on Decabromodiphenyl Ether and How it Changes Our Interpretations of Risk", *Organohalogen Compounds*, vol. 66, pp. 3800-3806; 2004.
Manias, E., "Polypropylene/Montmorillonite Nanocomposites. Review of the Synthetic Routes and Materials Properties", *American Chemical Society*, vol. 13, No. 10, pp. 3516-3523; Sep. 7, 2001.
Manias, E., "Nano-Dispersion of Clays Make Better, Cleaner Plastics", *Penn State MATSE Research Report*, 2000.
Zanetti, Marco, Abstract of "Fire Retardant Halogen-Antimony-Clay Synergism in Polypropylene Layered Silicate Nanocomposites", *American Chemical Society*; 2001.
"Brominated Flame-Retardant", *Wikipedia*; 2006.
"PBDE", *Wikipedia*; 2006.
"Clay Fillers Point Way to Reducing Flammability in Many Polymers", *Penn State MATSE Research Report*, 2000.

* cited by examiner

*Primary Examiner*—Peter Szekely
(74) *Attorney, Agent, or Firm*—Hoffmann & Baron, LLP

(57) ABSTRACT

A fire retardant composition that includes: a polyolefin and an additive package that includes a brominated polystyrene or decabromodiphenyl ether; a nanoclay; and metal oxide fillers in the nanometer particle range. The compositions can have high weight percentages of the additive package because of the compatibilizing effect of the nanoclay. The nanoclay is preferably a quantenary amine treated nanoclay, wherein the quantenary amine causes exfoliation of the nanoclay. The polyolefin is a polyethylene or a polypropylene and the preferred metal oxide is antimony oxide.

17 Claims, No Drawings

FLAME RETARDANT PLASTIC COMPOSITIONS

This application claims priority from provisional application Ser. No. 60/738,093, filed on Nov. 18, 2005, which is incorporated herein in its entirety.

FIELD OF THE INVENTION

The present invention relates to compositions of plastics and additive packages that have high fire resistance characteristics. In particular, the invention relates to compositions of plastics and additive packages that contain nanoclays, which substantially maintain the processing characteristics of plastics and are highly flame retardant.

BACKGROUND OF INVENTION

Most plastic materials are highly flammable and this limits their use in many products, especially building materials. Federal, state and municipal fire codes require building materials to pass different tests before they can be used for construction new buildings or the renovation of existing structures. This has significantly reduced the use of plastic products in the construction industry. Numerous attempts have been made to reduce the flammability of plastic products by adding different additives that have fire retardant or fire resistance characteristics. However, none of these attempts has produced a fire resistant plastic composition that can be easily processed and used as a substitute for non-fire resistant plastic formulations.

Flame retardants are materials that inhibit or resist the spread of fire. Brominated flame retardants (BFRs) is the designated name for a group of brominated organic substances that have an inhibitory effect on the ignition of combustible organic materials. BFRs are commonly used in electronic products as a means of reducing the flammability of the product and they are also use in clothes and furniture. The electronics industry accounts for the greatest consumption of BFRs. In computers, BFRs are used in four main applications: in printed circuit boards, in components such as connectors, in plastic covers, and in cables. BFRs are also used in a multitude of products, including plastic covers of television sets, carpets, paints, upholstery, and domestic appliances. BFRs have such a widespread number of applications because they are incredibly effective at fire prevention. In addition to reducing the likelihood that an article will ignite, brominated flame retardants hinder the spread of the fire.

Polybrominated diphenyl ether (PBDE) is a flame-retardant sub-family of the brominated flame-retardant group. Among the group of polybrominated diphenyl ethers used as flame-retardants, the fully brominated diphenyl ether, decabromodiphenyl ether (decaBDE), is the most commonly used. PBDEs have been used in a wide array of household products, including fabrics, furniture, and electronics. There are three main types, referred to as penta, octa and deca for the number of bromine atoms in the molecule. However, PBDEs, like other BFR's, are not aways completely compatible with plastic materials, such as polyolefins, and this has limited their use. Accordingly, ther is a need for a composition that includes PBDEs and different polyolefins, particularly, polypropylene.

Like most other plastic materials polypropylene and materials formed from polypropylene are flammable. Most materials containing polypropylene will also degrade over time when exposed to ultra violet (UV) light. Therefore, there is a need for polypropylene compositions that can be used to form materials which have a high flame retardance or fire resistance and are not subject to degradation when exposed to UV light. The present invention addresses both of these problems by forming compositions containing fire retardant PBDEs that are compatible with polyolefins.

SUMMARY OF THE INVENTION

The present invention is a flame retardant composition that includes: a polyolefin; a brominated polystyrene or decabromodiphenyl ether; a nanoclay; and carbon nanotubules in the nanometer particle range. The nanoclay is preferably a quaternary amine treated nanoclay, wherein the quaternary amine causes exfoliation of the nanoclay. The most preferred nanoclays are smectite, bentonite, hectorite, beidellite, stevensite and saponite.

The polyolefin is preferably a polyethylene or a polypropylene, more preferably high density polypropylene, high density polyethylene, low density polyethylene, a polyethylene-polypropylene copolymer, a cured polybutadiene liquid, medium density polyethylene, linear low density polyethylene, ethylene propylene elastomer, medium density polypropylene, or low density polypropylene. The preferred metal oxide is antimony oxide.

In preferred embodiments, the flame retardant composition includes from about 30% to about 50% by weight polyolefin; from about 30% to about 40% by weight decabromodiphenyl ether; from about 10% to about 30% by weight exfoliated clay; and from about 5% to about 15% by weight carbon nanotubules or metal oxide fillers. In another embodiment flame retardant composition includes from about 30% to about 60% by weight polyolefin; from about 10% to about 25% by weight brominated polystyrene; from about 10% to about 30% by weight exfoliated clay; and from about 5% to about 15% by weight carbon nanotubules or metal oxide fillers. These flame retardant compositions comply with the requirements of ASTME-84 for flame retardance.

The present invention is also a method for producing a flame retardant material. The method includes: heating a polyolefin resin to a first temperature, wherein the polyolefin melts; mixing a quaternary amine treated nanoclay with the melted polyolefin resin to form a first molten mixture; mixing an antimony oxide and a decabromodiphenyl ether or a brominated polystyrene with the first molten mixture to form a second molten mixture; and heating the second molten mixture to a second temperature to form a fire resistant material. In a preferred method, the fire resistant material is formed into an article by one of the well know methods for forming plastic articles, such as extruding or molding.

The first temperature is greater than or equal to the melting temperature of the polyolefin to ensure that the polyolefin is melted before it is mixed with the nanoclay. This allows the nanoclay to be evenly distributed in the polyolefin. The second temperature is greater than or equal to the melting temperature of the decabromodiphenyl ether or a brominated polystyrene. The second temperature is typically greater than the first temperature since decabromodiphenyl ether or a brominated polystyrene have higher melting temperatures than most polyolefins.

The present invention is also a method for producing a flame retardant material which includes combining brominated polystyrene, polypropylene, a compatibilizer and an exfoliated clay, carbon nanotubules, or metal oxide fillers in the nanometer particle range.

DETAILED DESCRIPTION OF THE INVENTION

The present invention is directed to additive packages which are added to plastics to form compositions that meet UV and flame retardant (FR) standards. These additive packages can be used with a variety of different plastic resins to render the compositions substantially inflammable. At high loading levels (i.e., compositions that contain up to 70% by weight of the additive packages), the material is still easily processed using standard plastic processing equipment. When formed into sheets or articles, the compositions do not drip during flame testing and are substantially UV inert. The plastic resins also maintain good mechanical properties after loading with high weight percentages of the additive package. The polyolefin/additive package compositions of the present invention are inflammable and have many uses in architectural and consumer related materials.

This invention is for additive packages which are added to plastic resins to provide protection against UV exposure and to improve fire retardant characteristics. When the additive packages are added to plastics resins, the plastic composition formed becomes substantially unflammable and does not break down when exposed to UV light. Materials formed from these compositions easily pass one of the most stringent flame tests for architectural materials, ASTM E-84 or the Steiner Tunnel Test, which typically is not used to test plastic materials. In addition, the fire retardant compositions of the present invention comply with fire codes for non-plastic materials and are not degraded by exposure to UV light like most plastic materials.

The ASTM E-84 tunnel test is designed to test the flame spread characteristics and smoke generation of flat surface building materials used for exposed surfaces, such as ceilings and walls, in a controlled burn chamber. The ASTM E-84 tunnel test compares surface burning characteristics of tested materials to those of asbestos cement board and untreated red oak lumber. A rating of 0 is assigned to asbestos cement board and a rating of 100 is assigned to untreated red oak flooring. Flame spread ratings of various species of untreated lumber range from 60 to 230. During this test, smoke emissions are also measured and ratings are assigned on the same scale. When tested, the compositions of the present invention had very low flammability ratings, almost as low as asbestos cement board.

The materials made from the composites of the invention do not readily degrade and any chemicals in the composites that could possibly be toxic are kept in a safe, inert form (i.e., encapsulated). The flame retardants used are commercial flame retardants (metal salts or halogenated compounds), which are readily available. Moreover, the flame retardants used are non-leachable and thus, environmentally friendly. The materials made from the compositions of the present invention are especially useful for construction and provide an inexpensive and safe replacement for lumber that is now used in homes and commercial buildings.

The present invention is distinguished from the prior art by the high percentages of additive package in the plastic compositions. The amount of additive package in the prior art was limited by the compatibility of the plastic resins with the additive package. The present invention uses a nanoclay to compatibilize the additive package and the plastic resins. This allows the compositions to contain higher amounts of additive package and provide correspondingly higher flame retardance to the compositions that are formed. Moreover, these compositions with high additive package loading rates also have unexpectedly good processability. The exfoliated clay, carbon nanotubules, or metal oxide fillers in the nanometer particle range make the compositions easier to process and reduce the process temperature requirements by 10-20% for ASTM E-84 flame retardant applications. This allows the compositions to be processed using conventional extrusion and molding methods into a wide variety of different articles and products. In the prior art, compositions with high additive package loading rates could not be processed and were, therefore, all but unusable.

The present invention includes the use of a nanoclay in compositions that include polyolefins, such as polypropylene, and additive packages to increase the fire retardant properties of materials made from the compositions. These maintain many of the properties and processing characteristics of the polyolefins and can be used to replace aluminum and steel in many applications which require UV inhibiting and/or flame retardant materials. Even though the fire retardant compositions lack the flexibility of the unfilled pololefins, compositions formed using lower molecular weight polyolefins have been found to be well adapted for uses as compounding agents and as primary raw materials. Without the nanoclay compatibilizer, these compositions with the high percentage of additive package would not retain sufficient polyolefin characteristics to have any significant industrial uses.

The high loading of flame retardant fillers as well as nanoclay to polyolefins is achieved by adding the components of the compositions in a specific sequence. The polyolefin is first heated to a temperature above its melt temperature and mixed with the nanoclay until the nanoclay is evenly distributed in the polyolefin. The fire retardant material, preferably brominated polystyrene or decabromodiphenyl ether, is then mixed into the polyolefin/nanoclay mixture and heated to a temperature above the melt temperatures of the polyolefin and the fire retardant material. The antimony oxide is then added and the composition is thoroughly mixed. Besides acting as a compatibilizer, the nanoclay adds barrier properties to the composition; slowing loss of mass and forming a ceramic composite layer when subjected to char forming conditions, i.e. flame.

In one embodiment, the present invention relates to flame retardant polypropylene compositions. Polypropylene as well as compositions and articles formed from polypropylene are highly flammable. The flame retardant characteristics of the additive package of the present invention are transferable, i.e., when these additive packages are combined with the polypropylene resins, they form compositions that are flame retardant. The polypropylene compositions can be used in a variety of structural, mechanical and load bearing applications, where the polypropylene must have high flame resistance characteristics. Moreover, the polypropylene-containing materials and articles can undergo high UV exposure and not degrade over time in mechanical functionality.

In preferred embodiments, compositions with increased flame retardance properties are formed by combining brominated polystyrene (both high and low molecular weight), polypropylene, a compatibilizer (preferably antimony oxide ($Sb_2O_3$) and maleic anhydride) and either an exfoliated clay, carbon nanotubules, or metal oxide fillers in the nanometer particle range. The exfoliated clays are described in U.S. Pat. No. 6,339,121 to Rafailovich, et al., which is incorporated herein in its entirety. These compositions can be used to form flame retardant materials which meet the requirements of ASTME-84 for flame retardance. In another embodiment, polybrominated diphenyl oxides can be combined with nylon to form materials that can be used in flame retardant applications where ASTEM E 4 flame retardance is required.

The compositions of the present invention are formed by combining one or more plastic resins and an additive package, preferably using a melt-mixing process. The plastic resins can be any thermoplastic resin, preferably a polyolefin, a polystyrene, a polyamide, a polyvinyl, a polycarbonate or a polysulfone and most preferably polyethylene terephthalate (PET), polyethylene (PE), polyvinyl chloride (PVC or vinyl), polypropylene (PP), polyvinylidene chloride (PVDC, Saran™), ethylene-vinyl alcohol (EVOH) or ethylene-vinyl acetate (EVA). The polyolefin can also include different processing additives and modifiers that would ordinarily be added to a plastic resin, such as colorants and lubricating agents.

The fire retardant material can be a brominated phenyl ether. Brominated phenyl ether are those compounds having at least one bromine atom bonded to the phenyl ether group. Examples include 2,3-dibromopropylpentabromophenyl ether, bis (tribromophenoxy) ethane, pentabromophenylpropyl ether, hexabromodiphenyl ether, octabromodiphenyl ether, decabromodiphenyl ether and polydibromophenylene oxide.

The invention is for a filler package added in a specific sequence which allows for very high loading of flame retardant fillers as well as nano-clay. The nanoclay adds barrier properties; slowing loss of mass, while also forming a ceramic composite layer when subjected to char forming conditions; i.e. flame. The flame used for the testing conformed to UL-94 conditions with the exception that the flame exposure time was exceeded. For the experiments, the plastic was continuously left in the flame. After quick char formation the first 1 or two mills (25-50 microns) of the plastic surface was converted into a ceramic composite material which shields the inner core of the plastic composite found under this ceramic char layer. After the thin dark layer, no change in coloration, or bubbles from off-gassing and melting of the polymer were visible. Even though the material lacks the flexibility of the unfilled polymer, the use of lower molecular weight polyolefins both as compounding agents and as primary raw materials.

A substantially inflammable polyolefin composition that includes from about 30 to about 50% by weight, preferably from about 35% to about 45% by weight of a polyolefin and from about 50% to about 70% by weight, preferably from about 55% to about 65% by weight of an additive package. The additive package includes a nanoclay, a polybrominated diphenyl ether and antimony oxide. The flame retardant composition includes from about 20% to about 60% by weight polyolefin, preferably from about 30% to about 50%; from about 20% to about 50% by weight decabromodiphenyl ether, preferably from about 30% to about 40% by weight; from about 5% to about 30% by weight exfoliated clay, preferably from about 10% to about 25% by weight; and from about 5% to about 15% by weight carbon nanotubules or metal oxide fillers, preferably from about 8% to about 12% by weight. In another embodiment flame retardant composition includes from about 30% to about 60% by weight polyolefin, preferably from about 30% to about 60% by weight; from about 10% to about 35% by weight brominated polystyrene, preferably from about 10% to about 25% by weight; from about 5% to about 30% by weight exfoliated clay, preferably from about 10% to about 25% by weight; and from about 5% to about 15% by weight carbon nanotubules or metal oxide fillers, preferably from about 8% to about 12% by weight. The preferred metal oxide filler is antimony oxide in an amount of from about 8 to about 12% by weight, preferably about 10% by weight.

The amount of additives which are combined with the plastic resins to form the compositions of the present invention vary over a wide range depending on the additive used and the resin or resins combined with the additive. For example, in a preferred embodiment, the ranges of additives for polypropylene nanocomposite transferable flame retardant package material containing:
  up to 50% by weight a total aggregate additive
  antomony oxide 5-30% by weight
  maleic anhydride grafted polystyrene 1-20% by weight
  exfoliated clay, carbon nonotubules, or metal oxide fillers in the nonometer particle size 3-20% by weight.

A preferred embodiment of the present invention is a non flammable polypropylene composition that does not bum under ASTM E-84 tunnel test conditions. Polypropylene is normally flammable. However, the compositions of the present invention which contain polypropylene do not bum and maintain acceptable processability even with high percentages of the additive package. The combination of polypropylene with flame retardants and nanoclays provides compositions that form clay thermo-shields under bum conditions. After being subjected to prolonged bum conditions, the plastic compositions remain substantially intact and unchanged at 1.5-3 mils below the surface without discoloration.

The flame used for the testing was in conformance with UL-94 conditions with the exception that the flame exposure time was exceeded, i.e., for the experiment, the plastic was continuously left in the flame. After quick char formation, the first 1 or two mills (25-50 microns) of the plastic surface was converted into a ceramic composite material which shielded the inner core of the plastic composite under this ceramic char layer. After the thin dark layer, no change in coloration, or bubbles from off-gassing and melting of the polymer were visible.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A flame retardant composition comprising:
  from about 30% to about 50% by weight of a polyolefin;
  from about 10% to about 25% by weight a brominated polystyrene or from about 30% to about 40% by weight decabromodiphenyl ether;
  from about 10% to about 30% by weight of an exfoliated nanoclay; and
  from about 5% to about 15% by weight carbon nanotubules or metal oxide fillers in the nanometer particle range.

2. The flame retardant composition according to claim 1, wherein the nanoclay is a quaternary amine treated nanoclay, wherein the quaternary amine causes exfoliation of the nanoclay.

3. The flame retardant composition according to claim 1, wherein the polyolefin is a polyethylene or a polypropylene.

4. The flame retardant composition according to claim 1, wherein the composition complies with the requirements of ASTME-84 for flame retardance.

5. The flame retardant composition according to claim 1, wherein the polyolefin is high density polypropylene, high density polyethylene, low density polyethylene, a polyethylene-polypropylene copolymer, a cured polybutadiene liquid, medium density polyethylene, linear low density polyethylene, ethylene propylene elastomer, medium density polypropylene, or low density polypropylene.

6. The flame retardant composition according to claim 1, wherein the nanoclay is smectite, bentonite, hectorite, beidellite, stevensite, or saponite.

7. The flame retardant composition according to claim 1, wherein the metal oxide filler is antimony oxide.

8. A flame retardant composition comprising:
from about 30% to about 60% by weight of a polyolefin;
from about 30% to about 40% by weight of a decabromodiphenyl ether or from about 10% to about 25% by weight of a brominated polystyrene;
from about 10% to about 30% by weight of a quaternary amine treated nanoclay, wherein the quaternary amine causes exfoliation of the nanoclay, and wherein the nanoclay is smectite, bentonite, hectorite, beidellite, stevensite, or saponite;
from about 5% to about 15% by weight carbon nanotubules or metal oxide fillers,
wherein the composition complies with the requirements of ASTM E-84 for flame retardance.

9. The flame retardant composition according to claim 8, wherein the polyolefin is polyethylene or polypropylene.

10. The flame retardant composition according to claim 8, wherein the polyolefin is high density polypropylene, high density polyethylene, low density polyethylene, a polyethylene-polypropylene copolymer, a cured polybutadiene liquid, medium density polyethylene, linear low density polyethylene, ethylene propylene elastomer, medium density polypropylene, or low density polypropylene.

11. The flame retardant composition according to claim 8, wherein the metal oxide filler is antimony oxide.

12. A flame retardant composition comprising:
from about 10% to about 35% by weight a brominated polystyrene or from about 20% to about 50% by weight decabromodiphenyl ether;
polypropylene blended with another polyolefin;
from about 5% to about 30% by weight exfoliated clay in the nanometer particle range; and
from about 5% to about 15% by weight antimony oxide.

13. A method for producing a flame retardant material comprising:
heating a polyolefin resin to a first temperature, wherein the polyolefin melts;
mixing a quaternary amine treated nanoclay with the melted polyolefin resin to form a first molten mixture;
mixing antimony oxide and a decabromodiphenyl ether or a brominated polystyrene with the first molten mixture to form a second molten mixture; and
heating the second molten mixture to a second temperature to form a flame retardant material,
wherein the flame retardant material comprises from about 30% to about 60% by weight polyolefin; from about 30% to about 40% by weight decabromodiphenyl ether or from about 10% to about 25% by weight brominated polystyrene; from about 10% to about 30% by weight exfoliated clay; and from about 5% to about 15% by weight carbon nanotubules or metal oxide fillers.

14. The method for producing a flame retardant material according to claim 13, further comprising forming an article from the fire resistant material.

15. The method for producing a flame retardant material according to claim 13, wherein the first temperature is greater than or equal to the melting temperature of the polyolefin.

16. The method for producing a flame retardant material according to claim 13, wherein the second temperature is greater than or equal to the melting temperature of the decabromodiphenyl ether or a brominated polystyrene.

17. The method for producing a flame retardant material according to claim 13, wherein the polyolefin is high density polypropylene, high density polyethylene, low density polyethylene, a polyethylene-polypropylene copolymer, a cured polybutadiene liquid, medium density polyethylene, linear low density polyethylene, ethylene propylene elastomer, medium density polypropylene, or low density polypropylene.

* * * * *